(12) United States Patent
Jian

(10) Patent No.: US 6,328,482 B1
(45) Date of Patent: Dec. 11, 2001

(54) MULTILAYER OPTICAL FIBER COUPLER

(76) Inventor: Benjamin Bin Jian, 233 N. Mollison Ave. #51, El Cajon, CA (US) 92021

( * ) Notice: Subject to any disclaimer, the term of this patent is extended or adjusted under 35 U.S.C. 154(b) by 0 days.

(21) Appl. No.: 09/327,826

(22) Filed: Jun. 8, 1999

Related U.S. Application Data

(60) Provisional application No. 60/088,374, filed on Jun. 8, 1998, and provisional application No. 60/098,932, filed on Sep. 3, 1998.

(51) Int. Cl.[7] .................................................... G02B 6/36
(52) U.S. Cl. ............................. 385/88; 385/93; 385/33; 385/34; 385/89
(58) Field of Search .................... 385/33, 88–94

(56) References Cited

U.S. PATENT DOCUMENTS

| | | |
|---|---|---|
| 3,968,564 | 7/1976 | Springthorpe . |
| 4,292,512 | * 9/1981 | Miller et al. . |
| 4,466,696 | 8/1984 | Carney . |
| 4,897,711 | 1/1990 | Blonder et al. . |
| 4,934,784 | * 6/1990 | Kapany et al. . |
| 4,945,400 | 7/1990 | Blonder et al. . |
| 5,181,224 | 1/1993 | Snyder . |
| 5,195,150 | 3/1993 | Stegmueller et al. . |
| 5,247,597 | 9/1993 | Blacha et al. . |
| 5,259,054 | 11/1993 | Benzoni et al. . |
| 5,337,398 | 8/1994 | Benzoni et al. . |
| 5,345,529 | 9/1994 | Sizer, II et al. . |
| 5,346,583 | 9/1994 | Basavanhally . |
| 5,434,939 | 7/1995 | Matsuda . |
| 5,471,552 | 11/1995 | Wuu et al. . |
| 5,501,893 | 3/1996 | Laermer et al. . |
| 5,742,720 | 4/1998 | Kobayashi et al. . |
| 6,023,546 | * 2/2000 | Tachigori . |

FOREIGN PATENT DOCUMENTS 6-138341    5/1994   (JP) .

OTHER PUBLICATIONS

Carson et al., "Future Manufacturing Techniques for Stacked MCM Interconnections", Journal of Metal, Jun. 1994, pp. 51–55.

Ko et al., "Bonding Techniques for Microsensors", Micromachining and Micropackaging of Transducers, Elsevier Science Publisher, Amsterdam, 1996, pp. 41–61.

Lee et al., "Low Cost High Quality Fabrication Methods and CAD for Diffractive Optics and Computer Holograms Compatible with Micro–Electronics and Micro–Mechanics Fabrication", Diffractive Optics and Optical Microsystems, Plenum Press, New York, 1997, pp. 133–138.

(List continued on next page.)

*Primary Examiner*—Hung N. Ngo
(74) *Attorney, Agent, or Firm*—Law Offices of James P. McFarland

(57) ABSTRACT

A multilayer optical fiber coupler for coupling optical radiation between an optical device and an optical fiber, including a first layer that has a fiber socket formed by photolithographic masking and etching to extend through said first layer, and a second layer bonded to the first layer. The first layer may comprise substantially single-crystal silicon. An optical fiber is inserted into the fiber socket to align the optical fiber precisely within the fiber socket. In one embodiment the optical fiber is a single mode fiber, and an optical focusing element formed on the second layer is aligned with the core of the single mode fiber. The second layer may comprise glass having an index of refraction that approximately matches the index of the optical fiber, and an optical epoxy is used to affix the optical fiber into the fiber socket and fill the gaps between the end face of the fiber and the second layer. Embodiments are disclosed in which an optical device such as a VCSEL or photodetector is bonded to the second layer. Alternative embodiments are disclosed in which the optical device is incorporated into the second layer. Advantages include reduced cost due to batch fabrication techniques, and passive alignment of the optical fiber.

29 Claims, 8 Drawing Sheets

OTHER PUBLICATIONS

Matsuda et al., "A Surface–Emitting Laser Array with Backside Guiding Holes for Passive Allignment to Parallel Optical Fibers", IEEE Photonics Technology Letters, vol. 8, No. 4, 1996, pp. 494–495.

Rainer et al., "Low Temperature Bonding of Expitaxial Lift Off Devices With AuSn", IEEE Transactions on Components, Packaging and Manufacturing Technology, Part B, vol. 19, No. 3, 1996, pp. 575–580.

Reimer et al., "Micro–Optic Fabrication Using One–Level Gray–Tone Lithography", SPIE vol. 3008, 1997, pp. 279–288.

Strzelecka et al., "Monolithic Integration of Vertical–Cavity Laser Diodes With Refractive GaAs Microlenses", Electronics Letters, vol. 31, No. 9, 1995, pp. 724–725.

Tai, "90% Coupling of Top Surface Emitting GaAs/AlGaAs Quantum Well Laser Output into 8 Micron Diameter Core Silica Fibre", Electronics Letters, vol. 26, No. 19, 1990, pp. 1628–1629.

Wang et al., "Robust Regression Applied to Optical–Fiber Dimensional Quality Control", Technometrics, vol. 39, No. 1, 1997, pp. 95–103.

Daschner, "Fabrication of Monolithic Diffractive Optical Elements by the Use of E–Beam Direct Write on an Analog Resist and a Single Chemically Assisted Ion–Beam–Etching Step", Applied Optics, vol. 34, No. 14, May 10, 1995, pp. 2534–2539.

Iga, "Active Parallel Microoptics", SPIE, vol. 1319 Optics in Complex Systems, 1990, pp. 486–490.

Iga et al., "Distributed–index Planar Microlens and Stacked Planar Optics: A Review of Progress", Applied Optics, vol. 25, No. 19, Oct. 1986, pp. 3388–3396.

Iga, "Chapter 10: Stacked Planar Optics", Fundamentals of Microoptics, Academic Press, 1984, pp. 195–207 and pp. 6–7.

Iga et al., "Stacked Planar Optics: An Application of the Planar Microlens", Applied Optics, vol. 21, No. 19, Oct. 1982, pp. 3456–3460.

Iga, "Two–dimensional Arrayed Microoptics", TUB2, Invited Paper, CLEO, 1989, pp. 44–45.

Oikawa et al., "Optical Tap Array Using Distributed–Index Planar Microlens", Electronics Letters, vol. 18, No. 8, Apr. 15, 1982, pp. 316–317.

* cited by examiner

MULTILAYER OPTICAL FIBER COUPLER

CROSS REFERENCE TO RELATED APPLICATIONS

Priority is hereby claimed to U.S. Provisional Application No. 60/088,374, filed Jun. 8, 1998 entitled LOW COST OPTICAL FIBER TRANSMITTER AND RECEIVER and U.S. Provisional Application No. 60/098,932, filed Sep. 3, 1998 entitled LOW COST OPTICAL FIBER COMPONENTS.

BACKGROUND OF THE INVENTION

1. Field of the Invention

The present invention generally relates to couplers for coupling optical radiation into and out of an optical fiber.

2. Description of Related Art

Optical fibers have by far the greatest transmission bandwidth of any conventional transmission medium, and therefore optical fibers provide an excellent transmission medium. An optical fiber is a thin filament of drawn or extruded glass or plastic having a central core and a surrounding cladding of lower index material to promote internal reflection. Optical radiation (i.e. light) is coupled (i.e. launched) into the end face of an optical fiber by focusing the light onto the core. For effective coupling, light must be directed within a cone of acceptance angle and inside the core of an optical fiber; however, any light incident upon the surrounding cladding or outside of the acceptance angle will not be effectively coupled into the optical fiber.

It is a difficult task to couple light into the central core of an optical fiber due to its small size and acceptance angle, particularly if the optical fiber is a single mode optical fiber. A typical single mode fiber has a core diameter of only 10 microns and an acceptance angle of only 10°. Single-mode fibers, which are designed to transmit only single-mode optical radiation, are widely utilized for telecommunications applications. Multimode optical fibers have a larger cross-section and a larger acceptance angle than single-mode fibers. For example, a typical multimode fiber has a core diameter of 50 microns and an acceptance angle of 23°. Because any optical radiation outside the core or acceptance angle will not be effectively coupled into the optical fiber, it is important to precisely align the core with an external source of optical radiation.

One conventional practice for making a fiber-pigtailed transmitter is to assemble an edge-emitting laser diode, an electronics circuit, a focusing lens, and a length of optical fiber and then manually align each individual transmitter. To align the transmitter, the diode is turned on and the optical fiber is manually adjusted until the coupled light inside the fiber reaches a predetermined level. Then, the optical fiber is permanently affixed by procedures such as UV-setting epoxy or laser welding. This manual assembly procedure is time consuming, labor intensive, and expensive. Up to 80% of the manufacturing cost of a fiber-pigtailed module can be due to the fiber alignment step. The high cost of aligning optical fiber presents a large technological barrier to cost reduction and widespread deployment of optical fiber modules.

One single-mode fiber has a cylindrical glass core of about 10 microns in diameter surrounded by a glass cladding with a circular outer diameter of about 125 microns. In some connections, slight variations in dimensions can drastically affect coupling efficiency, and therefore some optical fiber manufacturers carefully control the fiber's tolerances. For example, in a splice connection between two optical fibers, a large loss in the transmitted signal can occur if the two inner cores fail to align precisely with each other. For example, if the cores of two 10 micron single-mode fibers are offset by only 1 micron, the loss of transmitted power through a splice is about 5%. Therefore, to reduce coupling losses, manufacturers maintain cladding diameter tolerances within the micron to sub-micron range. For example, Corning Inc. specifies the tolerance of its optical fibers as 125±1 micron.

In order to provide passive alignment of optical fibers, various alignment techniques have been reported based on precisely etched holes on a wafer. For example, in Matsuda et al. "A Surface-Emitting Laser Array with Backside Guiding Holes for Passive Alignment to Parallel Optical Fibers", IEEE Photonics Technology Letters, Vol. 8 No. 4, (1996) pp. 494–495, a research group at Matsushita in Japan performed an experiment in which a shallow guiding hole on the backside of a back-emitting vertical cavity surface emitting laser (VCSEL) wafer is etched to a depth of 10 to 15 microns and a diameter of 130 microns. A multi-mode fiber stem 125 microns in diameter is inserted into the guiding hole with a drop of epoxy for passive alignment to the VCSEL. This group reported an average 35% coupling efficiency at 980 nanometers. The large core diameter of multi-mode fibers (e.g. 50 microns) allows this approach to be suitable for coupling light into multi-mode fibers; however the lack of a light-focusing mechanism prevents use of this method with single-mode fibers.

U.S. Pat. No. 5,346,583 to Basavanhally discloses a substrate having at least one lens formed on a first surface. An optical fiber guide is etched on a second surface of the same substrate, opposite the first surface. The optical fiber guide is used to mount an optical fiber on the second surface such that the central axis of the optical fiber is substantially coincident with the central axis of the lens, thereby giving the desired alignment. Fused silica and silicon are two common substrate materials. If the substrate material is fused silica (or glass), the fiber guide etch rate is very slow (typically 0.3 micron per minute or less) and as a result it is impossible to obtain fiber guides of sufficient etch depth, which is necessary to obtain precise angular alignment to single mode fibers. According to the method described in the patent, etching is to stop before it reaches the first surface where the lens resides. At the bottom of the etched fiber guide, the surface is typically neither smooth nor flat, which could causescattering and reflection loss if the refractive index of the substrate material is different than that of the optical fiber core (approximately 1.5).

U.S. Pat. No. 5,195,150 to Stegmueller et al. discloses an optoelectronic device that includes a substrate that has a recess for receiving a plano-convex lens and a recess on the other surface of the substrate aligned with the lens to receive an end of an optical fiber. The device disclosed by Stegmueller is subject to the same problems as the device disclosed in the Basavanhally patent.

SUMMARY OF THE INVENTION

In order to overcome the limitations of prior art optical fiber couplers, the present invention provides a multilayer optical fiber coupler for coupling optical radiation between an optical device and an optical fiber, including a first layer that has a fiber socket formed by photolithographic masking and etching to extend through said first layer, and a second layer bonded to the first layer. A multilayer optical fiber coupler is described that has a vertical through hole (a "fiber socket") in a first layer that precisely aligns an optical fiber with an optical focusing element formed in the second layer. A method for forming the fiber couplers is described herein that can advantageously utilize semiconductor processing techniques including photolithography and dry etching to fabricate the couplers. The precision of the fiber socket structure allows single mode optical fibers to be passively aligned, and is also useful for aligning multimode optical fibers.

In one embodiment, a first layer, typically comprising substantially single-crystal silicon, is deep-etched using a suitable process such as silicon Deep Reactive Ion Etching (DRIE) to form an array of fiber sockets that extend through the first layer. A second layer is formed to provide a corresponding array of optical focusing elements. The first and second layers are aligned using alignment fiducials and permanently bonded together, so that the fiber socket in the first layer precisely aligns the core of the optical fiber with the optical focusing element in the second layer. The bonded structure is then diced to form a plurality of separate couplers or arrays of couplers. An optical fiber is affixed into each fiber socket by any suitable means, such as an optical epoxy.

In order to provide precise, passive alignment of the optical fiber within the fiber socket, the fiber socket is formed to be only slightly larger than the fiber diameter. Single-crystal silicon is particularly useful to form the fiber sockets because silicon DRIE techniques have been developed recently as a result of advances in microelectromechanical system (MEMS) research, which allow vertical holes to be etched at high speeds (up to 10 micron/minute at present) with less than 1 micron vertical variation in hole diameter (i.e. ±0.5 micron). In one embodiment, the deep-etching process uses high definition photolithography and an appropriate high etch selectivity mask to create precisely-dimensioned fiber sockets. These fiber sockets then receive precisely-dimensioned optical fibers, thereby accurately aligning the optical fibers within the fiber socket. The fibers are held in place by epoxy or another suitable adhesive.

In one embodiment the second layer comprises borosilicate glass such as PYREX, which is advantageous for several reasons. The glass can be strongly and conveniently bonded to silicon by anodic bonding, which is a dry bonding process. The thermal expansion coefficient of borosilicate glass matches well with that of silicon, which provides a durable and reliable structure. Furthermore, the index of refraction of borosilicate glass approximately matches the index of refraction of the core of the optical fiber, which is the light transmitting section of the fiber, and therefore an optical epoxy can be used that also approximately matches the index of refraction of the optical fiber. In such an embodiment, the glass, epoxy, and optical fiber form a natural index-matched system, eliminating the need for polishing and anti-reflection coating the end face of the optical fiber which are current fiber optic industry practices, and resulting in further cost savings. Due to the index matching in some embodiments, optical radiation advantageously propagates substantially loss-free through the fiber end face, epoxy, and the adjacent surface of the second layer.

Due to the fiber sockets formed to extend through the silicon layer, a large number of single mode optical fiber couplers can be made on the wafer level with very low cost. One cost advantage is attributed to the batch microfabrication process and the elimination of the need to actively align the fiber. For example, assuming a 4-inch integrated wafer and a 1 mm×1 mm die size, about 7800 fully-integrated chips can be obtained by dicing the wafer. This approach allows optical couplers as well as other devices disclosed herein to be manufactured with the same kind of economies of scale as the silicon electronics industry, since the cost of the processing steps are shared by all the individual chips.

The optical fiber couplers are rugged and compact, and can be used in a variety of applications. The fiber couplers can be implemented in a wide variety of embodiments; for example the optical couplers may be incorporated with other devices such as VCSELs.

BRIEF DESCRIPTION OF THE DRAWINGS

For a more complete understanding of this invention, reference is now made to the following detailed description of the embodiments as illustrated in the accompanying drawing, wherein.

DETAILED DESCRIPTION

This invention is described in the following description with reference to the Figures, in which like numbers represent the same or similar elements.

Overview

As discussed in the background section, some single-mode fibers are constructed with very close tolerances. The highly precise diameter of the optical fiber is useful when a precision etched hole is designed to match it, as described herein.

Figure 1:
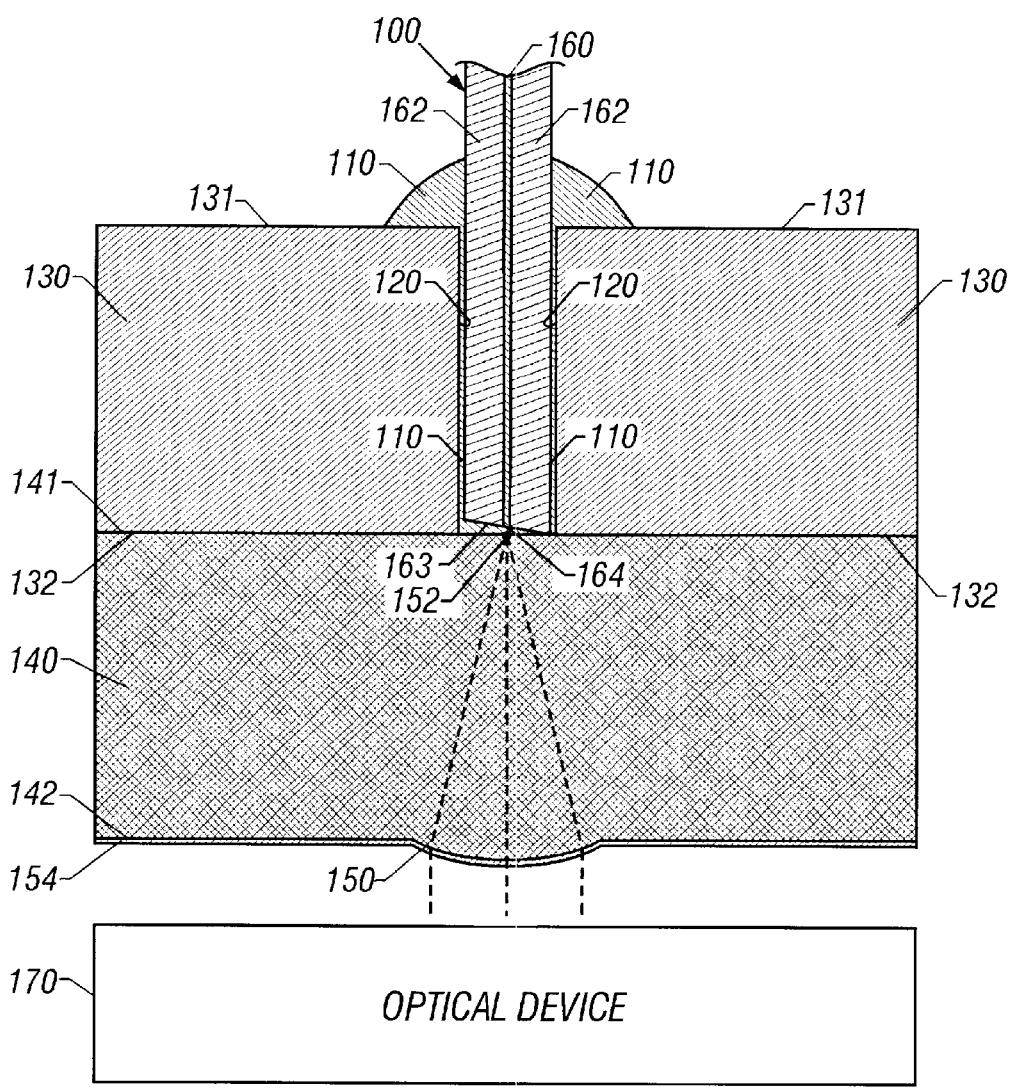
FIG. 1 is a cross-sectional view of a multilayer optical fiber coupler constructed in one embodiment of the invention.

FIG. 1 is a cross-sectional view of an optical fiber coupler constructed in one embodiment of the invention. An optical fiber 100 is affixed by a suitable adhesive 110 such as an optical epoxy into a fiber socket 120, which is a through hole that has been deep-etched completely through a first layer 130. In this embodiment the first layer 130 comprises silicon that has a form suitable for etching, such as single-crystal silicon. The fiber socket 120 extends completely through the first layer from a top surface 131 to a lower surface 132. The lower surface 132 of the first layer is bonded to a second layer 140 at its inner surface 141. The second layer 140 also has an outer surface 142 that, in some embodiments, includes an optical focusing element 150 such as a microlens formed thereon that has a focal point 152. An anti-reflective coating 154 is formed on the outer surface 142 of the second layer. The optical focusing element comprises a variety of optical elements such as refractive, diffractive, gradient-index lenses, or combinations thereof. In other embodiments, the outer surface 142 may not include an optical focusing element. For example the outer surface may be flat.

The optical fiber 100 includes a core 160 and a cladding 162, and in one embodiment the optical fiber is a single mode fiber. The optical fiber has an approximately flat end face 163 adjacent to the second layer. A core section 164 on the end face 163 is approximately aligned with the optical focusing element; for example, in one embodiment the core is approximately aligned with the focal point 152 of the microlens. The optical fiber may be a single mode fiber, which has a small core relative to multimode fibers. It may be noticed that the epoxy 110 is deposited throughout the fiber socket, and fills in the gaps between the end face 163 and adjacent opposing surface 141 of the second layer. In one embodiment the epoxy has an index of refraction that approximately matches the optical fiber, and therefore the end face 163 is not required to be flat, nor is it required to be polished or coated. FIG. 1 illustrates the end face 163 at a nearly 90° angle with the central axis of the optical fiber, but not precisely perpendicular.

An optical device 170 is arranged with respect to the optical focusing element 150 and the optical fiber 100 to provide the desired optical coupling with the core of the optical fiber. The focusing power of the optical element 150 varies dependent upon the utilization of the coupler, the optical device, and the thickness of the second layer; for example some optical devices will require collimation, other optical devices require focusing, others will require no significant focusing power. The optical device 170 can be a source or receiver of optical radiation. An example of a laser source is a laser diode emitter such as a VCSEL (vertical cavity surface emitting laser), and an example of a receiver is a photodetector. If the optical device is a laser source, the optical device 170 is arranged so that optical radiation emitted by it will be coupled into the optical fiber, or conversely if the optical device 170 is a receiver, it is arranged so that optical radiation emitted from the optical fiber will be received. In some embodiments such as shown in FIG. 1, the focusing element 150 is arranged in direct alignment with the central axis of the fiber socket and the core of the optical fiber, and its focal point 152 is approximately centered at the center of the end face 164. However, in other embodiments, the focusing element 150 may be arranged offset from the central axis of the fiber socket to couple an off-axis beam into the optical fiber. More, generally, the optical focusing element provides a focal point for optical radiation from the optical device, and the focal point is approximately situated along the central axis of said fiber socket so that the optical radiation is coupled into the core of the optical fiber.

In the embodiment of FIG. 1, the optical device 170 is a stand-alone device separate from the optical fiber coupler, and utilizes an anti-reflection coating 154 on the outer surface of the focusing element 150 to increase the transmission of light. However, in other embodiments, such as disclosed in FIG. 5 and 6, for example, the optical device 170 is bonded to the optical fiber coupler by any suitable method to permanently attach the optical device 170 to the optical fiber coupler.

Detailed Discussion

Figure 2:
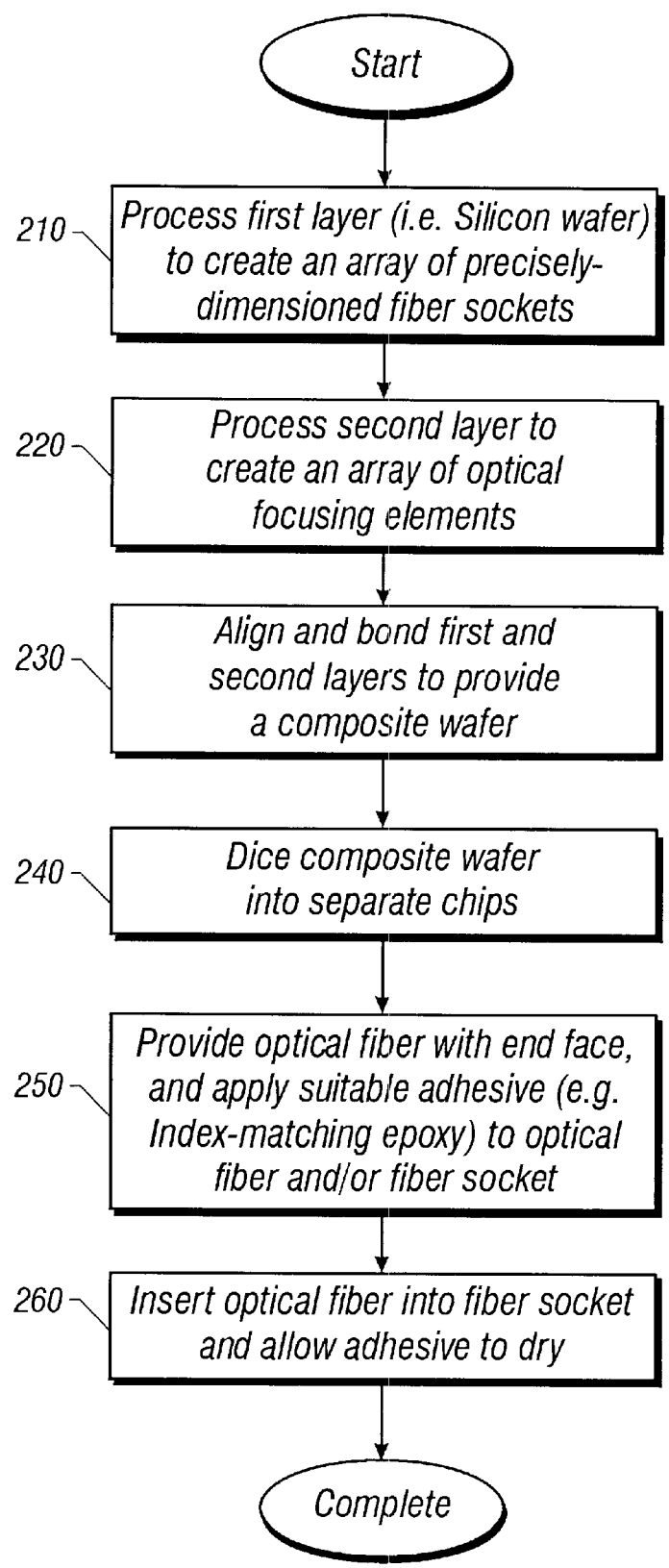
FIG. 2 is a flow chart illustrating operations to create a plurality of optical fiber couplers.

Reference is now made to FIG. 2, which is a flow chart of a series of operations to construct the optical fiber coupler shown in FIG. 1. Reference will also be made to FIGS. 3A–3J and FIG. 4, in conjunction with FIG. 2 to provide an example of the method described therein.

Figure 4:
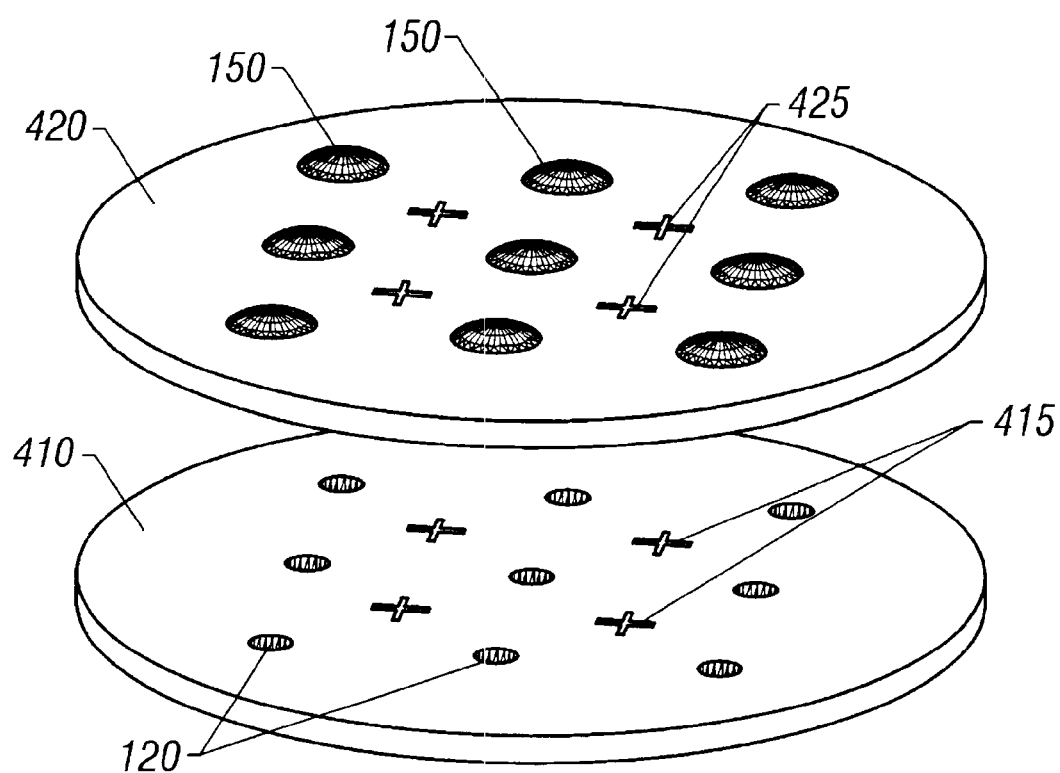
FIG. 4 is a perspective view of a processed first layer and second layer illustrating alignment of the two layers.

In step 210, the first layer 130, comprising a silicon wafer, is processed by a dry etching process to create an array of fiber sockets 120 that extend completely through the silicon wafer. FIG. 4 illustrates one embodiment of a processed silicon wafer 410 and a plurality of fiber sockets 120 arranged in a predetermined configuration on the wafer.

The silicon wafer 130 has a crystalline structure and thickness suitable for the deep etching process that forms the sockets; in one embodiment the silicon crystalline structure is single-crystal although other embodiments may comprise polycrystalline structures. In one embodiment the silicon wafer has a uniform thickness of about 0.4 mm which is sufficient to provide structural support for the optical fiber and within the limits of current deep-etch technology. In other embodiments the thickness of the silicon wafer could range between 0.1 mm and 3.0 mm, for example. Currently available silicon wafers typically have a thin disk configuration that varies from 2 to 8 in diameter. Preferably the silicon wafer is double-polished; i.e. it is polished on each side.

The first layer is etched using any suitable deep-etching process to create an array of fiber sockets 120 at predetermined locations. A suitable deep etching process for silicon is disclosed in U.S. Pat. No. 5,501,893 to Laermer, for example. Commercial etchers are available from vendors such as Plasma-Therm in St. Petersburg, Fla. Suitable etch masks include photoresist and silicon dioxide, for example. A photoresist mask gives about 80-to-1 etch selectivity, and an etch rate of about 2 micron per minute with smaller mask undercut. An oxide mask gives a 150-to-1 etch selectivity with higher etch rate and a greater mask undercut. A photoresist thickness of about 6–7 microns provides through wafer etching of a silicon wafer with a thickness of 400 microns.

Figure 3A:
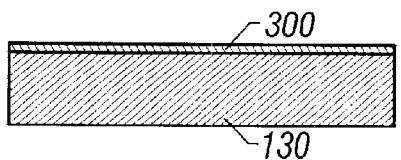
FIG. 3A is a cross section of a first layer silicon wafer that has a layer of photoresist deposited thereon.
Figure 3B:
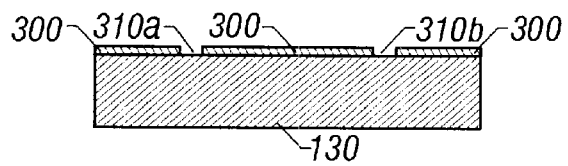
FIG. 3B is a cross section of the silicon wafer of FIG. 3A after openings have been patterned on the photoresist using photolithography.

FIG. 3A shows a photoresist layer 300 spun onto the upper surface of the silicon wafer 130. Next, via photolithography a precisely-defined pattern is formed on the photoresist layer 300 using a photolithographic mask that defines the desired locations of the fiber sockets, as shown in FIG. 3B. Openings 310a and 310b in the photoresist are shown in FIG. 3B.

A high selectivity etch mask is used to etch gaps 310 (FIG. 3A) on the silicon wafer 130. If desired, linearly tapered hard mask edges can be defined by a gray scale mask technology, as described for example by Lee et al., "Low Cost High Quality Fabrication Methods and CAD for Diffractive Optics and Computer Holograms Compatible with Micro-Electronics and Micro-Mechanics Fabrication" Diffractive Optics and Optical Microsystems, Martellucci and Chester, editors, Plenum Press, New York, 1997, pp. 133–138. For example, a tapered section near the entry to the fiber socket may extend into the socket a distance such as 15 microns to facilitate insertion of the optical fiber.

Figure 3C:
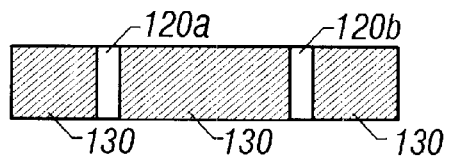
FIG. 3C is a cross section of the silicon wafer after the fiber sockets have been etched using photoresist as the etch mask and the photoresist stripped.

Next, as shown in FIG. 3C, precisely-dimensioned fiber sockets 120a and 120b are etched completely through the silicon wafer using the patterned photoresist as the etch mask and the deep silicon etching process, and the remaining photoresist is removed to create an array of fiber sockets on the silicon wafer, as shown at 410 in FIG. 4. The resulting fiber sockets are precision holes etched all the way through the silicon wafer. The diameter of the fiber socket should be slightly larger than the fiber diameter. In one embodiment the fiber sockets have an inner diameter of 127 microns, the optical fibers have a 125±1 micron outer diameter, the thickness of the silicon wafer is about 0.4 mm (i.e. 400 microns), and the deep-etch rate is about 2 microns per minute. Alignment fiducials such as crosses 415 are also etched into the silicon wafer or otherwise defined therein for purposes of alignment with the second layer. In some embodiments, vertical grooves may be etched on the walls of the fiber socket to allow the adhesive epoxy to flow during the fiber insertion step.

In step 220, a second layer is formed to create an array of optical focusing elements on the outer surface 142. The array configuration in the second layer corresponds with the configuration of the fiber socket array in the first layer, such that each optical element will be precisely registered with a fiber socket when the first and second layers are properly aligned with each other. For example, FIG. 4 shows a processed glass wafer 420 that has a plurality of microlenses 150 formed on the upper surface in a configuration that correspond with the fiber sockets in the silicon wafer 410.

The second layer comprises any suitable material, such as fused silica, silicon, or an optical glass such as borosilicate glass. The material of the second layer is selected to be substantially transmissive at the wavelengths of interest. In order to minimize unwanted reflection, in some embodiments the second layer has an index of refraction approximately equal to the optical fiber, i.e. approximately 1.5. In other embodiments in which the index of the second layer does not approximately match the optical fiber, an anti-reflection coating may be formed on the opposing surface of the second layer to reduce optical losses, such as disclosed with reference to FIG. 5. In such cases optical loss at the interface with the second layer is almost completely eliminated. In other embodiments, the opposing surface of the second layer may be coated with another type of coating, such as a beam splitter coating.

Alignment fiducials, such as crosses 425 shown in FIG. 4, are etched into the second layer to facilitate alignment with the first layer. Such fiducials can be included as separate features on the same photolithographic mask as that of the focusing element, or the fiducials can be made on the wafer surface in a separate step.

In one embodiment the second layer comprises borosilicate glass having a thickness of about 300–400 microns that is etched to provide a refractive microlens array. In other embodiments the optical focusing elements may comprise a diffractive microlens array etched onto the surface of the second layer. In still other embodiments the optical focusing elements comprise gradient-index microlenses that are formed by diffusing ions that vary the index of refraction in a defined manner.

Figure 3D:
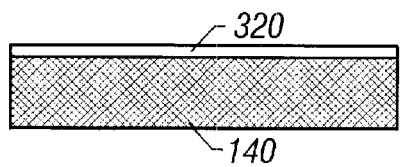
FIG. 3D is a cross section of a second layer glass wafer that has a layer of photoresist deposited thereon.
Figure 3E:
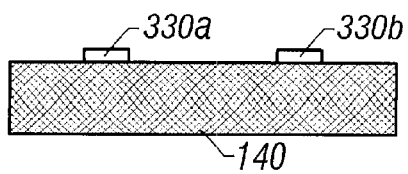
FIG. 3E is a cross section of the glass wafer after islands have been patterned on the photoresist using photolithography.
Figure 3F:
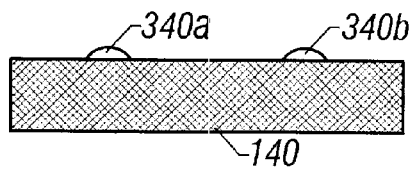
FIG. 3F is a cross section of the glass wafer after the photoresist melted in an oven.
Figure 3G:
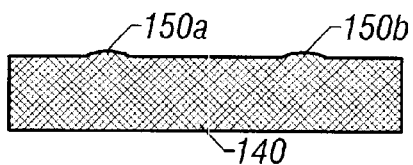
FIG. 3G is a cross section of the glass wafer after the glass wafer has been dry etched using the melted photoresist as the erodable mask.

As illustrated in FIGS. 3D to 3G, a refractive lens array can be made using photolithographic masks and etching. FIG. 3D shows a layer of photoresist 320 spun on the wafer surface. Then photolithography is used to pattern the photoresist into islands (disks or other shapes), as shown in FIG. 3E at 330a and 330b. The wafer is baked at an elevated temperature for a predetermined time so that the photoresist melts during which the surface area is minimized to spherical shapes before the wafer is cooled, as shown in FIG. 3F at 340a and 340b. The melted photoresist is used to mask the wafer during dry etching. The resist is eroded completely during etching and the retardation of the start of the glass etch is proportional to the glass thickness at that point of the wafer. As a result, the shape of the photoresist is transferred to the wafer, and the resulting refractive microlenses 150a and 150b are shown in FIG. 3G.

Figure 3H:
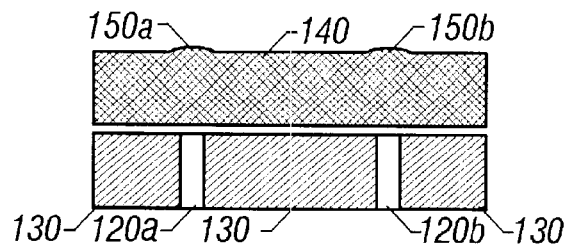
FIG. 3H is a cross section of the silicon wafer and the glass wafer prior to bonding.

In step 230, the first and second layers are aligned using the alignment fiducials formed thereon, shown at 415 and 425 in FIG. 4, and then bonded together permanently using any suitable processes. FIG. 3H shows the second layer 140 aligned with the first layer 130 so that the fiber sockets 120 are aligned with the microlenses 150. Precise alignment is useful in order to improve coupling efficiency of the coupler, and generally more precise alignment provides more efficient couplers. Using available technology, alignment to a tolerance of less than one micron can be achieved, and is desirable. Commercial wafer aligners are available from Karl Suss America in Phoenix, Ariz. and from Electronic Vision in Phoenix, Ariz.

Examples of bonding methods include anodic bonding, epoxy bonding, metal bonding, glass-frit bonding, wafer direct bonding, and polyimide bonding. If epoxy bonding is utilized, then it may be useful to deposit a thin layer of epoxy, let it begin curing, and then bond the two layers, which would reduce unwanted upwelling of epoxy into the fiber sockets.

In embodiments in which the second layer is glass, anodic bonding is a useful technology for bonding the silicon layer to the glass layer. Many manufacturers use anodic bonding, for example in the manufacturing of the ink-jet printer nozzle. In one embodiment borosilicate glass and silicon are stacked together and heated to 180–500° C. while a voltage of 200–1000 Volts is applied between the two plates for about 10 minutes. The thermal expansion coefficients of the silicon and borosilicate are approximately matched. Borosilicate is highly transparent from 500 nm to over 2000 nm, so it can be used for all the important telecommunication wavelength bands (850, 1300, and 1550 nm). The bonding strength of an anodic bond is so high that for most practical purposes the bonded wafer can be considered as a single wafer.

Figure 3I:
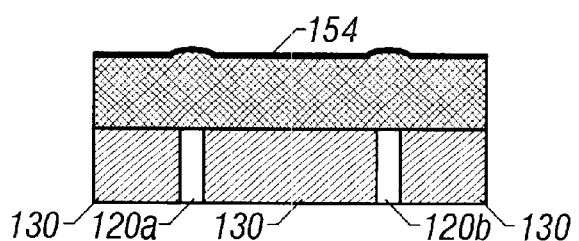
FIG. 3I is a cross section of the silicon wafer and glass wafer after bonding and formation of an anti-reflection coating.

FIG. 3I shows the first and second layer bonded together. In addition, FIG. 3I shows the AR coating 154 formed on the upper surface of the second layer 140 at the air interface.

In step 240, the composite wafer that includes the bonded first and second layers is diced into a plurality of separate chips, each comprising one or more optical fiber couplers. In one process, the composite wafer is attached to a wafer carrier and diced through by a diamond saw. In some processes, it may be useful to cut partially through the composite wafer, leaving a narrow section that can be easily broken apart. For example, it may be advantageous to cut through about 90% to 95% of the thickness of the composite wafer, then insert the optical fibers into the fiber sockets, and then break them into individual chips.

Figure 3J:
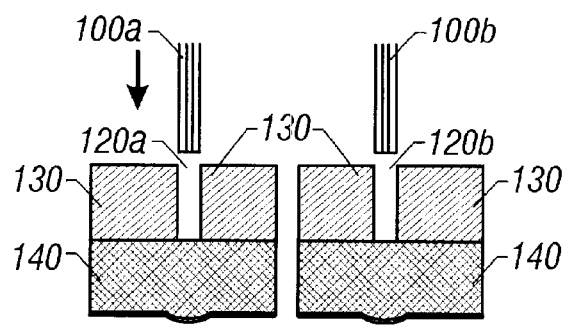
FIG. 3J is a cross section of the bonded wafer stack after wafer dicing and prior to fiber insertion.

FIG. 3J show the composite chip broken into two chips each having one coupler. As briefly discussed above, each of the chips comprises one or more optical fiber couplers in any suitable configuration for the end use. For example some uses may require only a single coupler on each chip, other uses may require two or more couplers in a predetermined configuration on a single chip, such as a two-dimensional array or a linear array configuration.

In step 250, an optical fiber is provided that has an end face formed therein. In some embodiments it may be useful to polish the end face; however in embodiments in which the index of refraction of the epoxy matches that of the fiber core, polishing is unnecessary.

A suitable adhesive is applied to the end of an optical fiber and/or into a fiber socket. In one embodiment an index-matching epoxy such as Epotech 301, 302, or 353ND, available from Epoxy Technologies, Inc. of Billerica, Mass. is used in order to approximately match the index of the optical fiber and the second layer. The epoxy is selected to be substantially transparent at the intended wavelength. FIG. 3J shows a first optical fiber 100a and a second optical fiber 100b positioned respectively for insertion into the first fiber socket 120a and the second fiber socket 120b.

In step 260, the end sections (fiber tips) of the optical fibers are inserted into the fiber sockets in any suitable manner. In one process, the optical fibers are inserted individually by hand, using a stereo microscope to aid in positioning. It has been observed in some embodiments that the optical fibers can be easily inserted into the fiber sockets with insertion rates of above one fiber per minute. However, if difficulties arise in insertion, a number of solutions are possible. For example, the fiber socket can be made slightly larger in diameter. Grooves can be created on the walls of the fiber socket to allow the epoxy to flow. Also, the cladding on the tip of the fiber can be made to a rounded shape to facilitate insertion, since only the fiber core is important for optical coupling.

Using the method described herein, optical fiber couplers can be implemented in many different embodiments.

Figure 5:
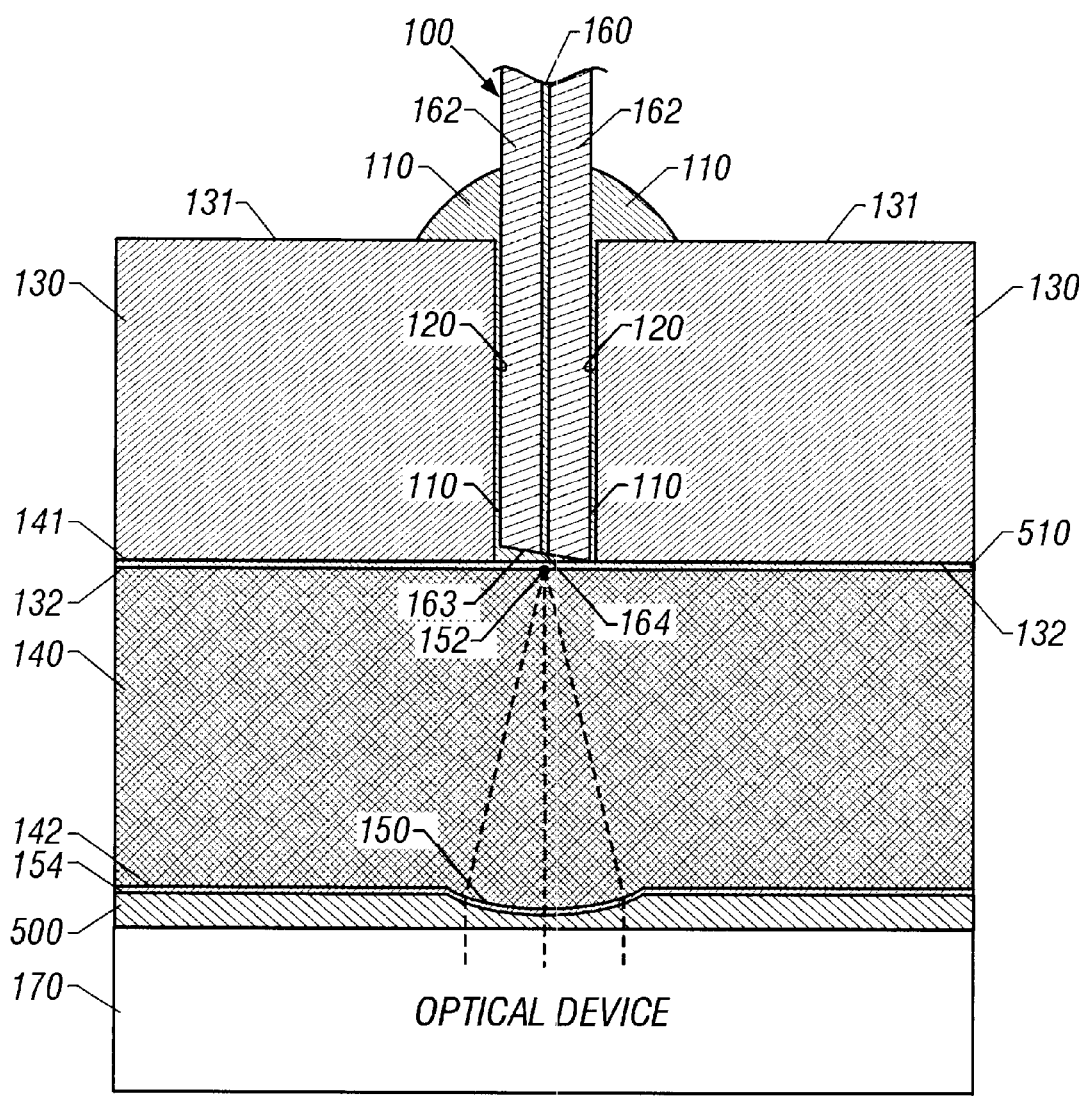
FIG. 5 is a cross-sectional view of a multilayer optical fiber coupler constructed in another embodiment of the invention in which the optical device is connected to the second layer.

FIG. 5 shows an embodiment of a fiber coupler in which the second layer 140 comprises a material having an index of refraction substantially different from the optical fiber, such as silicon. An epoxy layer 500 is used to directly couple the optical device 170 to the second layer 140. One advantage of utilizing a material other than glass for the second layer is that epoxy can be used to bond other structures such as the optical device 170 to the outer surface 142 of the second layer, which reduces cost and complexity over other bonding techniques such as metal bonding. In comparison, in embodiments in which glass is used as the second layer 140, epoxies whose index of refraction matches that of glass cannot be used to bond the optical device to the second layer because the refractive microlens surface would be nullified due to the filling of the air gap by index-matching epoxy. The silicon refractive lens does not have this problem, and therefore this structure can be directly bonded to a third layer using epoxy and still contain a refractive microlens at the silicon surface.

In this embodiment, due to the difference in refractive indexes between the second layer and the optical fiber, it is useful to coat the inner surface 141 of the second layer 140 with an AR coating 510 before bonding it to the first layer 130, in order to substantially reduce optical loss due to reflection at the inner surface 141.

Until the present invention, alignment of optical devices with optical fibers and particularly single mode fibers, has been a difficult task. Using the techniques set forth herein to simplify alignment and reduce its cost, many different types of devices can be integrated with the optical coupler on the wafer level at significantly reduced per-unit cost. In addition, integrating an optical device with the optical coupler can provide the advantages of ruggedness and compactness. One particular example to be described is an integrated VCSEL transmitter. In other embodiments, other optical device could be utilized; for example the VCSEL could be replaced with a photodetector to provide an integrated receiver.

Figure 6:
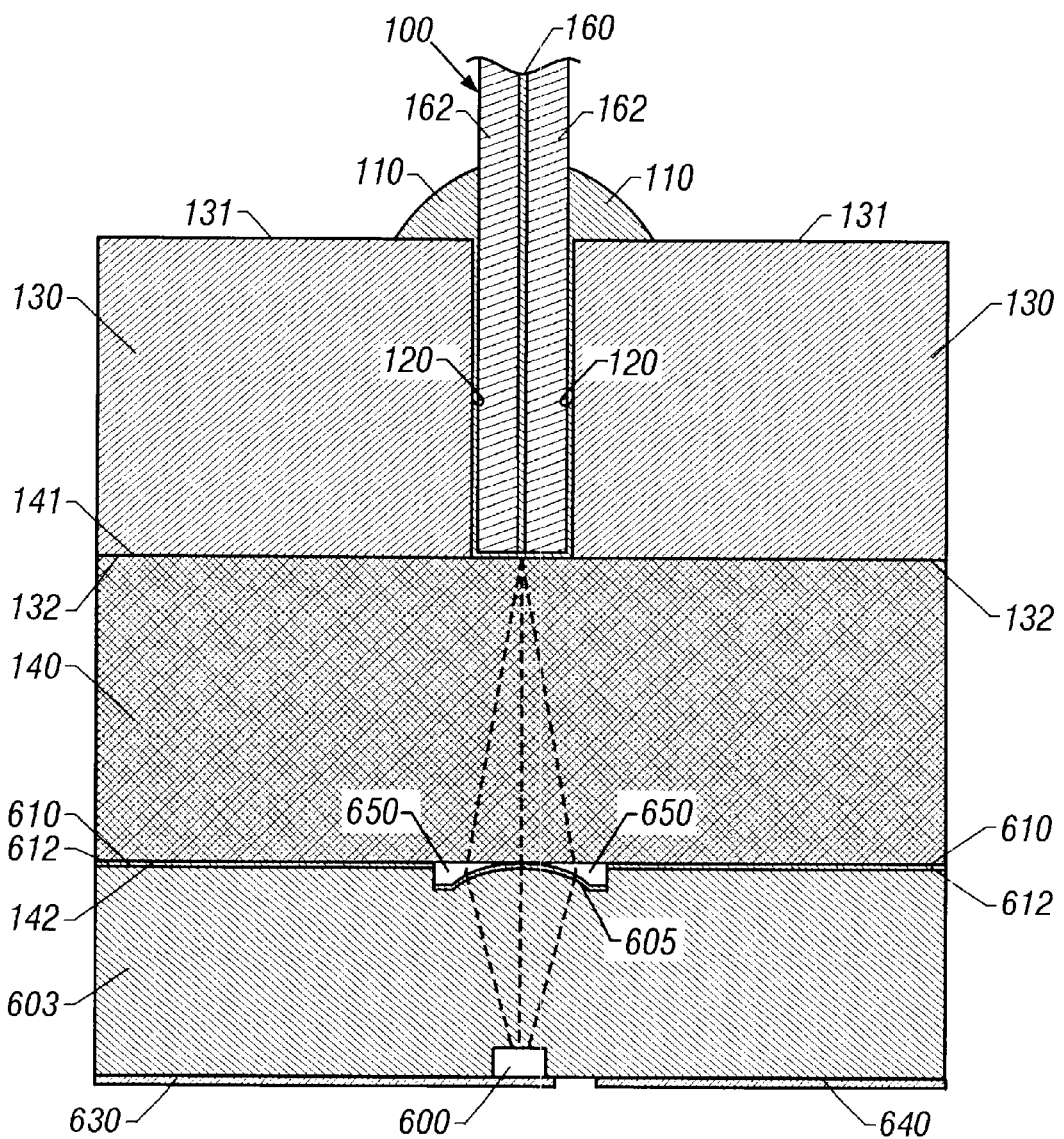
FIG. 6 is a cross section of a VCSEL transmitter for single-mode fiber, in which the VCSEL is integrated in a third layer.

Reference is now made to FIG. 6, which shows an optical fiber transmitter that includes a VCSEL 600 integrated with a fiber coupler in a single structure. Multiple VCSELs (vertical cavity surface emitting lasers) can be formed in parallel on a wafer using conventional methods in a batch fabrication process using microfabrication techniques such as photolithography, etching, or ion implantation processes. By utilizing the alignment techniques described herein, a single-mode fiber can be accurately aligned to a VCSEL without ever turning on the laser. For example, the VCSEL wafer can be formed in a predetermined configuration corresponding to the optical coupler on the first and second layers. The VCSEL wafer (a third layer) is provided with fiducial marks, aligned with the corresponding fiducial marks on the second and/or first layers, and then bonded with the second layer. Such low cost VCSEL laser transmitters have uses, for example in high speed, longer distance local area network applications, especially when long wavelength VCSEL technology becomes available.

FIG. 6 is a cross section of an integrated optical fiber transmitter, including a back-emitting VCSEL laser 600 that is formed on a VCSEL wafer 603. On the back of the VCSEL wafer 603, a microlens 605 is etched thereon, arranged in a position to focus light emitted from the VCSEL. In this embodiment, the outer surface 142 of the borosilicate glass wafer 140, which in this embodiment does not have a microlens, is bonded to a back surface 610 on the VCSEL wafer, and on its inner surface 141 the glass layer 140 is bonded to the first layer 130 that includes fiber socket 120. The back surface 610 of the VCSEL wafer has an anti-reflection coating 612 formed thereon optimized for transmission into borosilicate glass 140. In one embodiment, the VCSEL wafer comprises InGaAs and the VCSEL has a lasing wavelength of 980 nanometers. In some embodiments such as illustrated in FIG. 6, the VCSEL electrical contacts include a p-contact 630 and an n-contact 640) on the same side of the VCSEL wafer. The light from the VCSEL 600 is focused by the microlens 605, which is a convex lens etched on the backside of the VCSEL wafer. The light beam is focused to the core 160 of optical fiber 100, which is affixed by optical epoxy 110.

The embodiment of FIG. 6 illustrates that the focusing element can be placed on the optical device 170 instead of on the second layer 140. More generally, the focusing element can be placed on one or both of the opposing surfaces 142 and 610.

In one embodiment the layer 130 is bonded to layer 140 using anodic bonding, and the second layer 140 is bonded to VCSEL layer 603 using optical epoxy 650. The large index difference between a typical VCSEL wafer (refractive index about 3.6) and an optical epoxy (refractive index about 1.5) ensures that the microlens functions properly although the microlens space is filled with an optical epoxy 650 whose index matches that of the glass layer 140. One advantage of this design is that the electrical contacts 630 and 640 are exposed, thereby allowing easy electrical signal connection.

Any reflection from the microlens or any other surface in the optical path back to the VCSEL 600 can be a problem, since such reflection could stop the VCSEL from lasing. Therefore it is useful to form a high quality AR coating 612 with 0.1% residual reflectivity on the microlens surface.

In one embodiment the thickness of the integrated chip shown in FIG. 6 is about 700 microns assuming thicknesses of 400, 200 and 100 microns for the silicon, borosilicate glass, and VCSEL wafers, respectively. The size each chip can be about 1 mm or smaller. This thickness is easily within current industrial range for dicing.

Thermal expansion mismatch among the three layers can be reduced by the choice of borosilicate glass, and by the epoxy bonding process, which can be done at room temperature.

Figure 7:
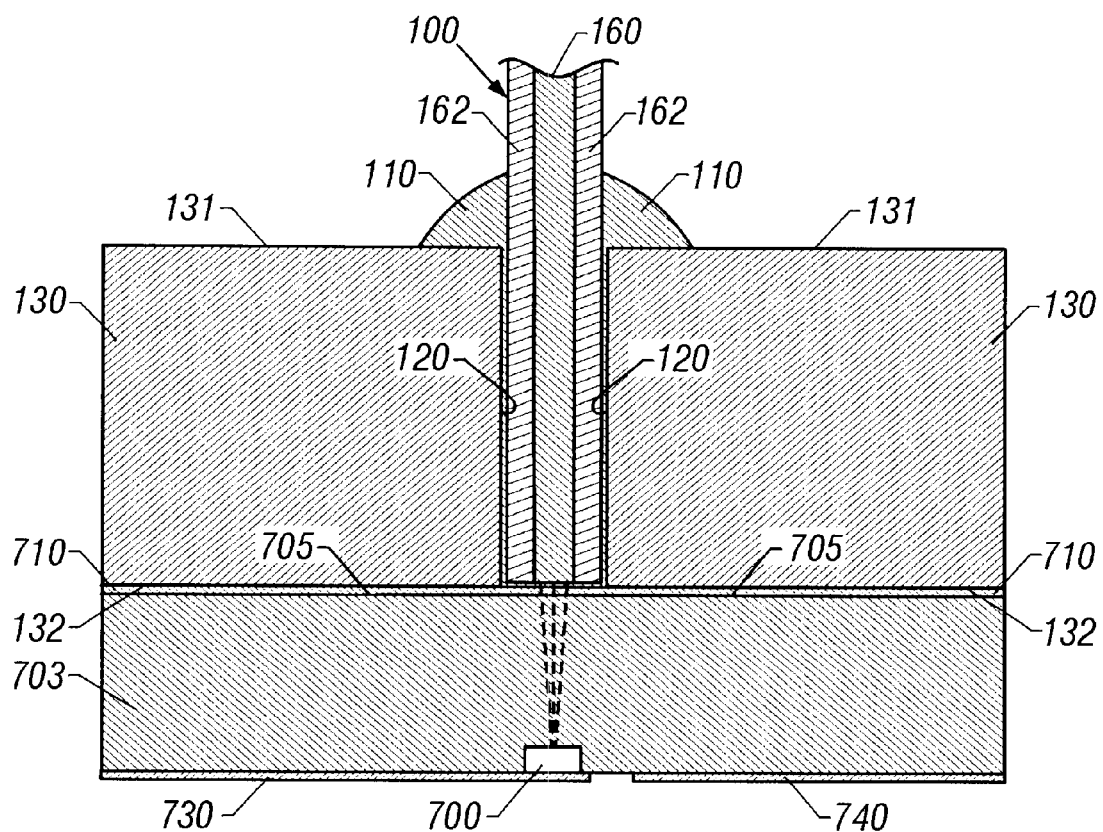
FIG. 7 is a cross section of a VCSEL transmitter for multi-mode fiber., in which the VCSEL is integrated with the second layer.

Reference is now made to FIG. 7, which illustrates an embodiment in which a fiber socket wafer is directly integrated to an optical device without a focusing element. One embodiment of FIG. 7 can be formed in a similar manner to that described with reference to the flow chart of FIG. 2, with the optical device being incorporated into the second layer and aligned with the fiber socket. This type of structure is useful, for example, for aligning multi-mode fiber to VCSEL lasers for low cost multi-mode fiber transmitter applications. It could also be useful for making integrated receiver by replacing the VCSEL wafer 703 with a photodetector wafer. A single-mode or a multi-mode integrated detector can be made this way.

FIG. 7 is a cross section of an integrated optical fiber transmitter that integrates the fiber socket 120 with a VCSEL 700 in a two-layer structure. In FIG. 7, a back-emitting VCSEL 700 is formed on a VCSEL wafer 703, which is bonded to the fiber socket wafer 130 that includes the fiber socket 120. The VCSEL wafer 703 has a back surface 705, and an anti-reflection coating 710 is formed thereon that is optimized for transmission into the optical fiber 100. In one embodiment, the VCSEL wafer 703 comprises InGaAs, and the lasing wavelength of the VCSEL 700 is about 980 nanometers. In the embodiment illustrated in FIG. 7, the VCSEL electrical contacts include a p-contact 730 and an n-contact 740 on the outer surface of the VCSEL wafer. The light from the VCSEL 700 diverges slowly inside the VCSEL wafer 703 before being coupled into the core 160 of the optical fiber, which is a multi-mode fiber that has a wider core than a single-mode fiber. The optical fiber 100 is affixed within the fiber socket by optical epoxy 110.

This structure will now be compared with that disclosed in Matsuda et al. "A Surface-Emitting Laser Array with Backside Guiding Holes for Passive Alignment to Parallel Optical Fibers", IEEE Photonics Technology Letters, Vol. 8 No. 4, (1996) pp. 494–495. Matsuda discloses a shallow hole etched on the back of a back-emitting VCSEL wafer. The shallow hole is coated with an anti-reflection coating before a multi-mode fiber is inserted and affixed using optical epoxy. An average of 35% coupling efficiency is achieved in the prior art. According to Matsuda, the main reason for the high optical loss is attributed to the rough surface on the bottom of the shallow hole despite the anti-reflection coating. Matsuda concluded by saying that by improving the surface quality of the bottom, coupling efficiency near unity can be achieved. Compared to the prior art, the bottom of the fiber socket is supported by the AR coated back surface 708 of the VCSEL wafer which should be optically smooth by suitable polishing before wafer bonding. Therefore, it is believed that nearly 100% coupling efficiency can be obtained for the embodiment shown in FIG. 7.

Bonding the VSCEL wafer 703 to the fiber socket wafer 130 may be accomplished using epoxy bonding or metal bonding. The fiber socket structure described herein provides a much stronger support to the fiber than the shallow hole disclosed by Matsuda as discussed above, and it is believed that this support will significantly improve the reliability of the device.

One advantage of the top contact, bottom-emitting VCSEL embodiment shown in FIG. 7 is that the electrical contacts 730 and 740 are on the outside of the device, thereby allowing easy access to the exposed electrical signal connections.

In the embodiment of FIG. 7, the reflections back to the VCSEL 700 may be less of a concern than the embodiment of FIG. 6 due to the divergent nature of the optical beam from the VCSEL. Therefore, although it will be useful to provide an AR coating 710, many embodiments of FIG. 7 will not require a high-quality AR coating.

The thickness of the integrated chip is about 500 $\mu$m assuming thicknesses of 400 micron and 100 micron for the silicon and VCSEL wafers, respectively. The size of each chip can be about 1 mm or smaller.

It is advantageous for the wavelength of the VCSEL to be matched with other optical devices in the system. For example, silicon detectors are common, low-cost photodetectors. However, the lasing wavelength of an InGaAs VCSEL is typically 950–980 nanometers, which is beyond the detection range of low-cost silicon detectors. Currently, 850-nanometer VCSELs are available in GaAs, which can be used with silicon detector; however such VCSELs are available only in a top-emitting configuration. To integrate such a top-emitting VCSEL with the fiber socket wafer, the VCSEL laser must be situated on the VCSEL wafer surface adjacent to the fiber socket wafer 130. In such a case, the electrical contact pads are sandwiched between the VCSEL wafer and fiber socket wafer. In order to provide electrical connections to the accessible, outward-facing surfaces of such top-emitting VCSEL, through wafer via holes filled with metal can be formed in the VCSEL wafer to connect the contact pads to the outer surface, using the teachings disclosed in "Future Manufacturing Techniques for Stacked MCM Interconnections" by Carson et al., Journal of Metal, June 1994, pages 51–55, for example.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A multilayer optical fiber coupler for coupling optical radiation between an optical device and an optical fiber, comprising:
    a first layer, said first layer defining a fiber socket formed by photolithographic masking and etching to extend through said first layer, said fiber socket sized to receive and align said optical fiber therein;
    a second layer bonded to said first layer;
    said optical fiber having an end section that extends through the fiber socket, said optical fiber terminating at an end face situated approximately adjacent to the second layer, said fiber socket aligning and positioning said optical fiber therein; and
    wherein said second layer has an index of refraction substantially equal to the index of refraction of the core of said optical fiber.

2. The optical fiber coupler of claim 1 wherein said optical fiber comprises a single mode optical fiber.

3. The optical fiber coupler of claim 1 wherein said first layer comprises substantially single-crystal silicon.

4. The optical fiber coupler of claim 1 wherein said second layer comprises silicon.

5. The optical fiber coupler of claim 1 wherein said second layer comprises glass.

6. A multilayer optical fiber coupler for coupling optical radiation between an optical device and an optical fiber, comprising:
   a first layer, said first layer defining a fiber socket formed by photolithographic masking and etching to extend through said first layer, said fiber socket sized to receive and align said optical fiber therein;
   a second layer bonded to said first layer;
   said optical fiber having an end section that extends through the fiber socket, said optical fiber terminating at an end face situated approximately adjacent to the second layer, said fiber socket aligning and positioning said optical fiber therein; and
   an epoxy that fills the gap between the end face of the optical fiber and the adjacent portion of the second layer, said epoxy having an index of refraction that approximately matches the index of the optical fiber so that optical losses are reduced.

7. A multilayer optical fiber coupler for coupling optical radiation between an optical device and an optical fiber, comprising:
   a first layer, said first layer defining a fiber socket formed by photolithographic masking and etching to extend through said first layer, said fiber socket sized to receive and align said optical fiber therein;
   a second layer bonded to said first layer;
   said optical fiber having an end section that extends through the fiber socket, said optical fiber terminating at an end face situated approximately adjacent to the second layer, said fiber socket aligning and positioning said optical fiber therein; and
   an optical device integrated into said second layer.

8. The optical fiber coupler of claim 7 wherein said optical device comprises a VCSEL to provide an integrated fiber optic transmitter.

9. The optical fiber coupler of claim 7 wherein said optical device comprises a photodetector to provide an integrated fiber optic receiver.

10. A multilayer optical fiber coupler for coupling optical radiation between an optical device and an optical fiber, comprising:
    a first layer, said first layer defining a fiber socket formed by photolithographic masking and etching to extend through said first layer, said fiber socket sized to receive and align said optical fiber therein;
    a second layer bonded to said first layer, wherein said second layer comprises an optical focusing element arranged to couple optical radiation with said optical fiber;
    said optical fiber having an end section that extends through the fiber socket, said optical fiber terminating at an end face situated approximately adjacent to the second layer, said fiber socket aligning and positioning said optical fiber therein; and
    wherein said optical focusing element comprises a gradient-index lens.

11. The optical fiber coupler of claim 10 wherein said optical focusing element has a focal point for optical radiation from the optical device, said optical fiber includes a core and a cladding surrounding said core, and said focal point is approximately situated along the central axis of said fiber socket, so that the optical radiation is coupled into said core of said optical fiber.

12. The optical fiber coupler of claim 11 wherein said optical fiber comprises a single mode fiber.

13. A multilayer optical fiber coupler for coupling optical radiation between an optical device and an optical fiber, comprising:
    a first layer, said first layer defining a fiber socket formed by photolithographic masking and etching to extend through said first layer, said fiber socket sized to receive and align said optical fiber therein;
    a second layer bonded to said first layer, wherein said second layer comprises an optical focusing element arranged to couple optical radiation with said optical fiber;
    said optical fiber having an end section that extends through the fiber socket, said optical fiber terminating at an end face situated approximately adjacent to the second layer, said fiber socket aligning and positioning said optical fiber therein; and
    wherein said optical focusing element comprises a diffractive lens.

14. A multilayer optical fiber coupler for coupling optical radiation between an optical device and an optical fiber, comprising:
    a first layer, said first layer defining a fiber socket formed by photolithographic masking and etching to extend through said first layer, said fiber socket sized to receive and align said optical fiber therein;
    a second layer bonded to said first layer;
    said optical fiber having an end section that extends through the fiber socket, said optical fiber terminating at an end face situated approximately adjacent to the second layer, said fiber socket aligning and positioning said optical fiber therein; and
    a third layer bonded to said second layer, said third layer comprising an optical device.

15. The optical fiber coupler of claim 14 wherein said optical device comprises a VCSEL.

16. The optical fiber coupler of claim 14 wherein said second layer comprises an optical focusing element.

17. The optical fiber coupler of claim 14 wherein said third layer comprises an optical focusing element.

18. A method for making a plurality of monolithic optical fiber couplers that align an optical fiber that have a predetermined diameter, comprising:
    photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;
    bonding said first layer to a second layer together to provide a composite wafer;
    dicing said composite wafer into a plurality of chips, each chip including one or more fiber sockets;
    affixing optical fibers into said fiber sockets;
    forming a plurality of VCSELs in said second layer in a predetermined configuration corresponding to the configuration of said fiber sockets; and
    aligning said first layer with said second layer so that said VCSELs are aligned with said fiber sockets, and then performing said step of bonding said first and second layers together to provide said composite wafer.

19. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets;

forming a plurality of photodetectors in said second layer in a predetermined configuration corresponding to the configuration of said fiber sockets; and aligning said first layer with said second layer so that said photodetectors are aligned with said fiber sockets, and then performing said step of bonding said first and second layers together to provide said composite wafer.

20. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets;

forming a plurality of optical focusing elements in said second layer in a predetermined configuration corresponding to the configuration of said fiber sockets; and aligning said first layer with said second layer so that said optical focusing elements are aligned with said fiber sockets, and then performing said step of bonding said first and second layers together to provide said composite wafer.

21. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets; and wherein said step of forming said plurality of optical focusing elements comprises forming refractive lenses.

22. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets; and wherein said step of forming said plurality of optical focusing elements comprises forming diffractive lenses.

23. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets; and wherein said step of forming said plurality of optical focusing elements comprises forming gradient-index lenses.

24. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets; and wherein said second layer comprises an optical material that has an index of refraction substantially equal to the index of refraction of said optical fiber, and said step of affixing said optical fibers into said fiber sockets includes applying an epoxy that approximately matches the index of refraction of said optical fiber into the fiber sockets to fill the gap between adjacent sections of said second layer and said optical fiber.

25. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets; and wherein said step of bonding said first and second layers comprises anodic bonding.

26. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets; and wherein said step of bonding said first and second layers comprises epoxy bonding.

27. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets; and wherein said step of bonding said first and second layers comprises metal solder bonding.

28. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets; and wherein said dicing step comprises cutting partially through said composite wafer, then performing said affixing step to affix optical fibers to said fiber sockets, and then physically separating said composite wafer into chips, each of which comprises one or more optical couplers.

29. A method for making a plurality of monolithic optical fiber couplers that align an optical fiber that have a predetermined diameter, comprising:

photolithographically masking and etching a first layer to form a plurality of through holes through the first layer, thereby forming a plurality of cylindrical fiber sockets in a predetermined configuration, said fiber sockets having a diameter approximately equal to the diameter of the optical fiber;

bonding said first layer to a second layer together to provide a composite wafer;

dicing said composite wafer into a plurality of chips, each chip including one or more fiber sockets;

affixing optical fibers into said fiber sockets; and bonding a third layer that comprises an optical device to said second layer.

* * * * *